Aug. 13, 1929.  F. P. McCAULEY  1,724,766
PUMP
Filed June 25, 1926  2 Sheets-Sheet 1

Francis P. McCauley
INVENTOR
BY Victor J. Evans
ATTORNEY

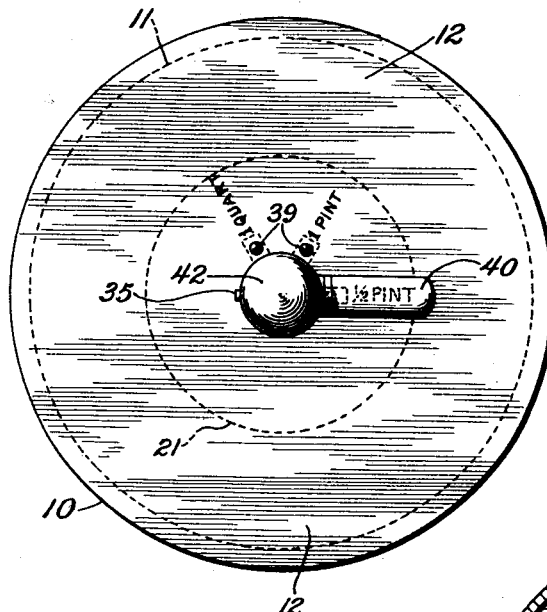
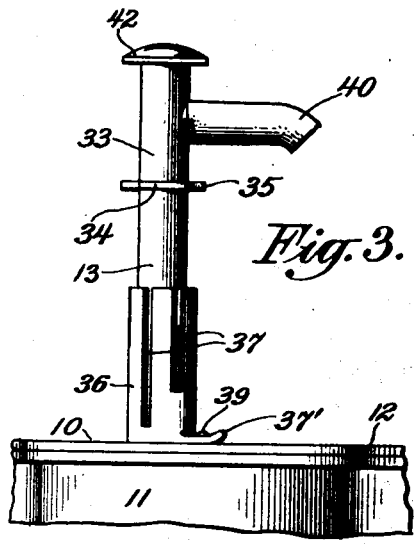
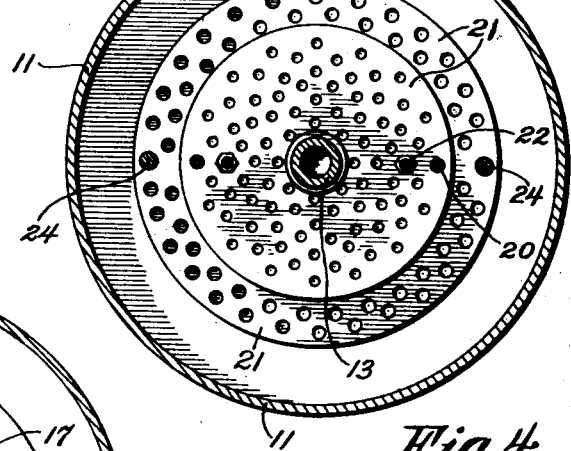
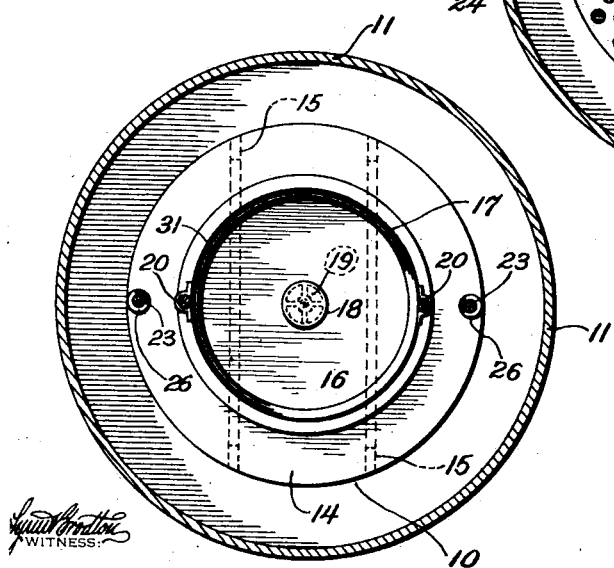

Patented Aug. 13, 1929.

1,724,766

UNITED STATES PATENT OFFICE.

FRANCIS P. McCAULEY, OF WESTBURY, NEW YORK.

PUMP.

Application filed June 25, 1926. Serial No. 118,558.

This invention relates to improvements in pumps, and more particularly to liquid dispensing pumps for beverages.

The principal object of the invention resides in a pump for dispensing an approximate predetermined amount of liquid upon each actuation tnereof, and means for approximately varying the predetermined amount according to the amount which is desired to be dispensed.

Another object of the invention is to provide a dispensing pump which agitates the liquid to be dispensed, both before and after the dispensing of the same, so that a proportionate amount of the ingredients of the liquid is dispensed on each actuation of the pump.

A further object of the invention aims to provide a pump especially adapted for the dispensing of milk in dairies, restaurants, lunch counters and the like, and which includes a tubular plunger rod through which the milk to be dispensed is adapted to pass upon actuation of the device, the pump being so constructed that no milk remains in the tube above the level of milk in the can after a dispensing operation.

A still further object is the provision of a dispensing pump which is so designed as to be easily taken apart and cleaned, so that the same may always be kept in a highly sanitary condition.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 2 is a top plan view of the same.

Figure 3 is an enlarged side elevation of the upper end of the pump.

Figure 4 is a horizontal sectional view on the line 4—4 of Figure 1.

Figure 5 is a similar view on the line 5—5 of Figure 1.

Figure 1:
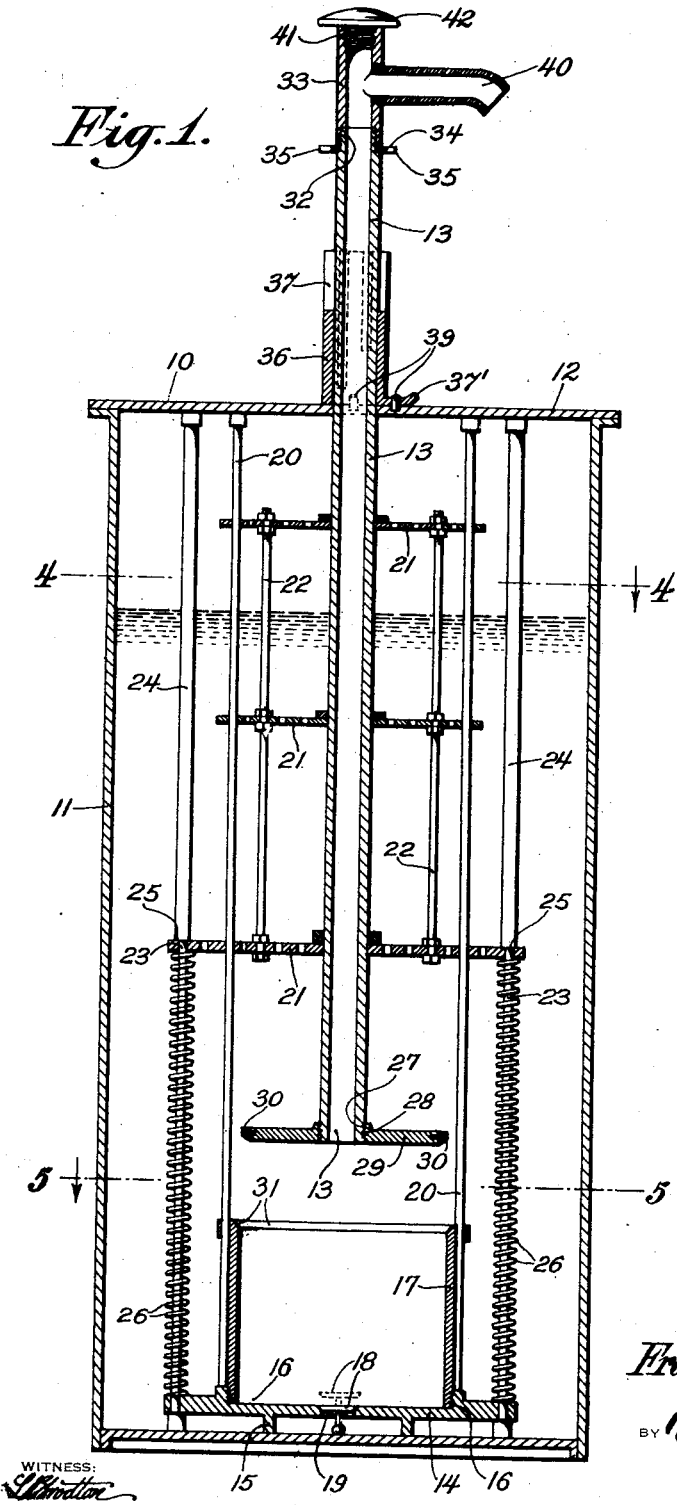
Figure 1 is a vertical sectional view through my improved dispensing pump.
Figure 6:
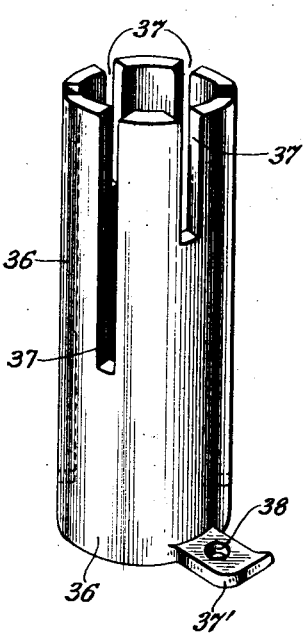
Figure 6 is a detail perspective view of the regulating sleeve.

In dispensing milk from a can or tank, in small quantities, such as by the quart, pint or glass, it is the present practice to employ a pump of the plunger type, but it has been found that the full proportion of the qualities of the milk are not evenly dispensed. It is understood that the cream in milk settles at the top of the same, and which cream is not dispensed until the level of milk in the can reaches a low level, due to the fact that upon actuation of the pump, the milk to be dispensed is drawn from the bottom of the can which contains none of the rich proteins. It has been proven by actual tests of the pumps now used for the dispensing of milk, that they dispense a very low percent of the fat contained in milk, and the statutes of many states and cities require that milk for sale shall contain a certain percent of solids which includes fat, and a certain percent of solids, not fat. It will be seen that with the present style of pump it is impossible for the dispensers of milk to honestly comply with the laws, but with the construction of pump which is about to be described, it is possible to overcome the above objections and meet the requirements of the statutes.

Referring more particularly to the drawings, the reference numeral 10 designates my improved dispensing pump in its entirety, and which is shown in position upon a milk can or tank 11. My improved pump includes a cover plate 12 having an opening centrally thereof for the reception of a reciprocable tubular plunger rod 13 which extends well into the tank, and above the cover plate 12. The wall of the opening serves as a bearing for the plunger rod.

Resting on the bottom of the can is a base plate 14 made from a casting and which has its underside provided with legs 15 for supporting the plate above the bottom of the can for a purpose to be presently explained. The base plate is provided with a recess 16, the axis of which is in alignment with the axis of the tubular plunger rod 13, for threadedly receiving the lower end of a cylinder 17. A gravity valve 18 is provided for normally closing an opening 19 in the base plate and which operates for a purpose to be presently described.

Guide rods 20 are disposed on opposite sides of the axis of the plunger rod 13 and have their ends respectively threaded into bosses provided on the cover plate 12 and base 14, so as to join the same and hold them in rigid spaced relation.

Fixedly mounted on the plunger rod 13 in spaced relation to each other are perforated agitator disks 21, which are held spaced by brace rods 22 so that they move as a single unit with the plunger rod. The disks are slidably mounted upon the guide rods 20, and lowermost disk is also slidably mounted upon the reduced lower portion 23 of a pair of brace bars 24 also threaded into bosses in the cover plate and base. The shoulder 25 on each brace bar 24 serves to limit the upward movement of the plunger rod as the lowermost disk 21 abuts the same. Expansion springs 26 encircle the reduced portions 23 of the brace rods and are interposed between the underside of the lowermost plate 21 and the base 14, to normally hold the agitator disks and plunger rod in a raised position.

The extreme lower end of the plunger rod is externally screw threaded as at 27 for coaction with threaded walls 28 of an opening provided centrally in a plunger head or piston 29 of a diameter to snugly fit within the inner walls of the cylinder 17. The plunger head is provided at its peripheral edge with a yieldable ring or washer 30, having its underside bevelled for co-action with the bevelled top edge 31 on the cylinder 17, for forcing the plunger head into the cylinder as the same comes in contact therewith.

The top of the plunger rod is provided with a threaded reduced portion 32 for threadedly receiving a tubular extension 33, while interposed between the shoulder formed by the reduced portion 32 on the tubular shaft, and the extension and held thereby, is a collar 34 having oppositely disposed radially extending pins 35. A sleeve 36 is slidably mounted on the upper end of the tubular rod and rests upon the cover 12. The said sleeve is provided with oppositely disposed slots 37 of different lengths and which open onto the top peripheral edge of the sleeve and are of a width to freely receive the pins 35. The lower end of the sleeve has an outwardly extending finger 37' projecting therefrom and which is provided with an opening 38 for the reception of either of a plurality of vertical pins 39 on the cover, so as to lock either of the opposed sets of slots within the path of downward movement of the pins 35 on the plunger rod. The pins 39 may be identified with the sets of slots 37 by placing indicia adjacent thereto, such as "quart", "pint" and "one-half pint".

Tapped into the side wall of the extension 33 is a spout or nozzle 40, which is removably mounted thereon by screw threads to facilitate cleaning of the same. The top end of the extension is internally screw threaded to receive the threaded shank 41, of a push button or head 42, against which pressure is applied by the hand of an operator to actuate the device against the tension of the springs 26.

In operation, we shall presume that the can 11 is comparatively full of milk or other liquid and it is desired to approximately dispense a pint of milk. The sleeve 36 is moved to a position to cause the pin 39 marked "pint" to enter the opening 38 in the finger 37', at which time the corresponding sets of slots 37 will be in alignment of the path of movement of the pins 35. The slots 37 which permit of the approximate dispensing of a "pint" of liquid are equal to one-half the length of those marked "quart" which in the present instance is the maximum amount capable of being dispensed on one actuation of the plunger, as the capacity of the cylinder is one quart. The device is now set for dispensing approximately a "pint" of liquid, whereupon the operator pushes downward upon the push-button 42 causing the downward movement of the plunger rod and forcing the plunger head into the cylinder. The downward movement of the plunger is limited by the pins 35 abutting the ends of the slots 37, therefore the plunger head only moves half-way into the cylinder, which forces the milk therein upward through the tubular plunger rod 13 and out of the spout 40. As the plunger moves downward, the agitator disks also move downward which causes the mixing of the milk in the can which will of course refill the cylinder as the plunger head moves out of the same on its upward stroke. After the plunger has reached the limit of its downward stroke, the operator releases the push button, whereupon the springs 26 automatically return the parts to normal position, and during the return movement, the agitator disks 21 again mix the contents of the can, thus keeping the same in a mixed condition. Should it be desired to approximately dispense a "quart" of liquid, the sleeve is so set to permit of the movement of the piston to displace the entire contents of the cylinder. However, it will be understood that the cylinder may be of a larger capacity, whereupon its maximum dispensing quantity may be increased.

The upward or return stroke of the plunger will create a suction within the can, causing the lifting of the gravity valve 19 and the sucking of liquid through the opening in the base. The suction is of course broken as the plunger head moves out of the cylinder, but at that time the cylinder is full and ready for the next dispensing stroke of the plunger. The valve 19 also closes upon the breaking of the suction so as to trap the liquid therein. By this arrangement it is possible to remove substantially the entire contents of the can.

After each return stroke of the plunger, the column of liquid remaining therein above the level of liquid in the can automatically drains back into the can as the liquid will seek its own level.

From the foregoing description, it will be seen that I have provided a pump which is capable of dispensing milk or other liquids in an efficient manner as the contents to be dispensed are continuously being mixed upon the dispensing operations of the device.

The parts are so designed that they may be easily taken apart for cleaning. For instance, the entire pump unit is withdrawn from the can and dipped in boiling water, while the push button 42 and spout 40 may be unscrewed and a cleaning implement inserted therethrough. This arrangement permits the device to always be kept in a highly sanitary condition.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a liquid dispenser, the combination of a receptacle adapted to contain a liquid to be dispensed, a cylinder within said receptacle in open communication with the interior of the same, and a reciprocable plunger slidably mounted within said receptacle and having a tubular plunger rod extending out of same and provided with an outlet, said plunger being normally disposed above said cylinder but adapted to be manually moved into the same upon depression of said plunger rod to force liquid from said cylinder through said tubular plunger rod and out of the outlet therein, and agitator disks carried by said plunger rod for movement therewith, guide rods on which said disks are slidably mounted, and expansion springs on certain of said guide rods and interposed between the lowermost disk and the bottom of said receptacle for returning said plunger to normal position upon release of the pressure thereon.

2. A liquid dispensing device comprising a receptacle adapted to contain a liquid, a cylinder within said receptacle, a reciprocable plunger mounted in axial alignment with said cylinder and normally disposed above the same, said plunger having a hollow tubular plunger rod provided with an outlet, and selective means for varying the limit of movement of said plunger within said cylinder upon the depression of the same, said means including a turnable sleeve freely mounted on said plunger rod and supported upon the top of said receptacle and having different length slots therein for respective movement into the path of movement of a member carried by said plunger rod and normally disposed out of said slots.

3. A liquid dispensing device comprising a receptacle adapted to contain a liquid, a cylinder within said receptacle, a reciprocable plunger mounted in axial alignment with said cylinder and normally disposed above the same, said plunger having a hollow tubular plunger rod provided with an outlet, a sleeve turnably mounted on said tubular plunger and supported upon the top of said receptacle and having different length slots therein for positioning in the path of movement of a member carried by said tubular member for varying the limit of movement of said plunger within said cylinder upon the depression of the same, and means for locking said sleeve in position with the selected aligned slots in the path of said member.

4. A liquid dispensing pump comprising a base having supporting legs for supporting the same in spaced relation to its supporting surface, a cylinder supported upon said base and open at its top, a cover for the receptacle in which the pump is arranged, guide rods having their ends fixedly connected to said base and cover, a tubular plunger rod slidably mounted in said cover in axial alignment with said cylinder, a plunger head on the lower end of said tubular plunger rod for movement into said cylinder, a spout at the upper end of said plunger rod, agitating disks carried by said tubular plunger rod and slidable on said guide rods, and expansion springs on certain of said guide rods and interposed between said base and the lowermost agitator disk.

In testimony whereof I hereby affix my signature.

FRANCIS P. McCAULEY.